(12) United States Patent
Burgfels et al.

(10) Patent No.: US 8,119,552 B2
(45) Date of Patent: Feb. 21, 2012

(54) CATALYST COMPOSITION FOR HYDROCRACKING AND PROCESS OF MILD HYDROCRACKING AND RING OPENING

(75) Inventors: Götz Burgfels, Bad Aibling (DE); Stephan Wellach, Laudenbach (DE); Josef Schönlinner, Obing (DE); Friedrich Schmidt, Rosenheim (DE); Volker Kurth, Bad Aibling (DE); Vebjorn Knut Grande, Trondheim (NO); Jorunn Steinsland Rosvoll, Ranheim (NO); Per Aksel Skjølsvik, Flåtasen (NO)

(73) Assignee: Süd-Chemie AG (DE)

( * ) Notice: Subject to any disclaimer, the term of this patent is extended or adjusted under 35 U.S.C. 154(b) by 432 days.

(21) Appl. No.: 12/091,706

(22) PCT Filed: Oct. 26, 2006

(86) PCT No.: PCT/EP2006/010351
§ 371 (c)(1),
(2), (4) Date: Jun. 25, 2009

(87) PCT Pub. No.: WO2007/048616
PCT Pub. Date: May 3, 2007

(65) Prior Publication Data
US 2009/0301929 A1    Dec. 10, 2009

(30) Foreign Application Priority Data

Oct. 27, 2005    (EP) .................................... 05023544

(51) Int. Cl.
*C10G 47/00*    (2006.01)
(52) U.S. Cl. ............... 502/67; 502/60; 502/66; 502/71; 502/77; 502/79
(58) Field of Classification Search .............. 502/60, 502/66–67, 71, 77, 79
See application file for complete search history.

(56) References Cited

U.S. PATENT DOCUMENTS

| | | | |
|---|---|---|---|
| 3,830,724 | A | 8/1974 | Schutt |
| 4,137,152 | A | 1/1979 | Chester et al. |
| 4,305,808 | A | 12/1981 | Bowes et al. |
| 4,397,827 | A | 8/1983 | Chu |
| 4,696,732 | A | 9/1987 | Angevine et al. |

(Continued)

FOREIGN PATENT DOCUMENTS

EP    0101177    2/1984

(Continued)

OTHER PUBLICATIONS

Schlenker et al., The Framework Topology of ZSM-48: A High Silica Zeolite; Zeolites; 1985; pp. 355-358; vol. 5.

(Continued)

*Primary Examiner* — Walter D Griffin
*Assistant Examiner* — Brian McCaig
(74) *Attorney, Agent, or Firm* — Florek & Endres PLLC

(57) ABSTRACT

The present invention relates to a catalyst composition for the reaction of hydrocarbons comprising a zeolite with has a faujasite structure and a fibrous zeolite which comprises essentially non-crossing one-dimensional channels. Further, the catalyst composition comprises in a preferred embodiment a metal component selected from metals of the group VIB and VIII of the periodic table of elements and their compounds. The invention relates further to a process for the synthesis of such a catalyst composition and to a process for hydrocracking hydrocarbon feedstocks by using said catalyst composition.

27 Claims, 7 Drawing Sheets

U.S. PATENT DOCUMENTS

| | | | |
|---|---|---|---|
| 4,802,971 A | 2/1989 | Herbst et al. | |
| 4,857,495 A * | 8/1989 | Gortsema et al. | 502/214 |
| 4,921,595 A | 5/1990 | Gruia | |
| 4,983,273 A | 1/1991 | Kennedy et al. | |
| 4,985,134 A | 1/1991 | Derr, Jr. et al. | |
| 5,208,197 A | 5/1993 | Vassilakis et al. | |
| 5,279,726 A * | 1/1994 | Ward | 208/111.15 |
| 5,308,475 A | 5/1994 | Degnan et al. | |
| 5,500,109 A | 3/1996 | Keville et al. | |
| 5,611,912 A | 3/1997 | Han et al. | |
| 5,762,902 A | 6/1998 | Benazzi et al. | |
| 5,800,698 A | 9/1998 | Tejada et al. | |
| 5,928,498 A | 7/1999 | McVicker et al. | |
| 6,042,716 A | 3/2000 | Morel et al. | |
| 6,509,290 B1 * | 1/2003 | Vaughn et al. | 502/214 |
| 6,531,054 B1 | 3/2003 | Gerritsen et al. | |
| 6,716,339 B2 * | 4/2004 | Liu et al. | 208/208 R |
| 2004/0232047 A1 | 11/2004 | Benazzi et al. | |

FOREIGN PATENT DOCUMENTS

| | | |
|---|---|---|
| EP | 0703003 | 3/1996 |
| EP | 1336649 | 8/2003 |
| WO | WO 93/21284 | 10/1993 |
| WO | WO 98/56876 | 12/1998 |
| WO | WO 98/56878 | 12/1998 |
| WO | WO 99/22577 | 5/1999 |
| WO | WO 00/77129 | 12/2000 |
| WO | WO 2005/051535 | 6/2005 |

OTHER PUBLICATIONS

Szostak, R.; Handbook of Molecular Sieves; Handbook of Molecular Sieves; 1992; pp. 551-553; Van Nostrand Reinhold; U.S.

Jourdan, A., European Search Report in EP05023544; Mar. 14, 2006; 3 pages; European Patent Office; Munich, Germany.

Jourdan, A., International Search Report in PCT/EP2006/010351; Jun. 4, 2007; 5 pages; European Patent Office.

Jourdan, A., Written Opinion of the International Searching Authority in PCT/EP2006/010351; European Patent Office; Munich, Germany.

Schlenker et al., "The Framework Topology of ZSM-48, a High Silica Zeolite," Zeolites, 5:355-358 (1985).

* cited by examiner

CATALYST COMPOSITION FOR HYDROCRACKING AND PROCESS OF MILD HYDROCRACKING AND RING OPENING

The present invention relates to a novel catalyst composition, especially for the conversion of sulphur rich hydrocarbons. Further, the present invention relates to a process for the conversion of sulphur containing hydrocarbon feedstocks into a form suitable for use in automotive diesel. The process is also suitable for the upgrading of distillates, e.g. from thermal or catalytic cracking.

Crude oil is composed of a variety of hydrocarbons which are separated and put to a wide variety of uses. The light and heavy gas oils of crude oil are often used in the manufacture of heating oils and automotive diesel. It is well known, however, that the gas oils need to be refined before they can be used. It is known that the light and heavy gas oils contain high levels of sulphur (e.g. 0.1 to 1% wt) which need to be reduced before the gas oil can be employed as a fuel in order to meet emissions requirements.

Moreover, the cetane number of the fuel needs to be adjusted such that it is in a suitable range. The cetane number is an indication for the combustibility of diesel and is the amount of cetane in a mixture of cetane and alpha-methyl-naphthalene expressed in volume percent, which gives under selected conditions in a standard motor the same ignition delay as the diesel sample to be examined.

In Europe for example, in order to meet stringent emissions requirements, diesel must have a cetane number of at least 51. Typically, straight run distillates from naphthenic and heavy crude oils tend to have cetane numbers as low as 40, with cracked distillates having significantly lower cetane numbers. Robust, old diesel motors, which do not correspond to the EU-norm, can be run with diesel with cetane numbers from 40 on, wherein todays automobiles usually need a minimum cetane number of 58.

Cetane numbers can for example be determined optically according to ASTM D-613.

The gas oils obtained from crude oil generally comprise paraffins, naphthenes and aromatic compounds. Whilst the paraffins and naphthenes are generally suitable for use in diesel directly, the aromatic compounds in the gas oil have very low cetane ratings (e.g. less than 30) making the gas oil unsuitable for use in diesel directly. It is therefore essential to be able to convert the aromatic compounds present in the gas oil into higher cetane number compounds, i.e. paraffins and naphthenes. This is achieved by cracking as is well known. It is essential also that some of the aromatic components are converted to paraffins. Naphthenes themselves offer cetane numbers of 40 to 70. Higher molecular weight molecules with one long side chain have high cetane numbers; lower molecular weight molecules with short side chains have low cetane numbers. Thus a cracked feedstock even with a very high content in naphthenes may not have a high enough cetane number to be used directly as a diesel fuel.

However, care must be taken during a cracking process not to crack the aromatic compounds (and other hydrocarbons which will be present, i.e. the naphthenes and paraffins) into naphtha and gases, i.e. into low boiling point hydrocarbon components. The components of diesel should have boiling points in the range from 150 to 360° C. If a process to convert the aromatic portion of the gas oil results in hydrogenation, ring opening and chain cracking, large amounts of naphtha components having a too low boiling point might result.

The problem faced by the petroleum chemist is that linear or branched hydrocarbons are generally more susceptible to cracking than cyclic aliphatic hydrocarbons. Thus, to ring open a cyclic aliphatic hydrocarbon without then cracking the formed linear chain is a challenge. The person skilled in the art is therefore searching for ways in which the aromatic compounds in the gas oil fraction can be hydrogenated and ring opened without being cracked into smaller chains.

Usually, a catalyst system is used in mild hydrocracking which needs very pure starting distillate oils, especially due to the high sulphur content. Therefore, a pre-treatment of these distillates is required so that they are present in the required purity (U.S. Pat. No. 6,042,716). Catalyst systems based on zeolites are often used for this purpose. Zeolites are three-dimensional (tecto-) silicates which are also called molecular sieves. Zeolites have a porous three-dimensional structure comprising linked oxygen tetrahedra arranged around a cation. A precise definition of zeolites according to the International Mineralogical Association is to be found in: D. S. Coombs et al., The Canadian Mineralogist, vol. 35, p. 1571-1606 (1997).

Proposals to avoid the aforementioned problem have been discussed for a long time, as for example in U.S. Pat. No. 4,305,808. The disadvantage of the catalyst systems based on zeolites in prior art, especially if they are used for hydrocarbon transformations, consists in that an increased formation of products with a very low boiling point of <150° C. is observed. Some zeolites with large pores, as zeolite Beta, have a very strong paraffin-selectivity when used for a mixture of aromatic compounds and paraffin. Aromatic compounds remain in the starting distillate oils (feedstock) and after such a transformation, usually paraffins and low boiling products are obtained (U.S. Pat. No. 4,983,273).

Further, zeolites like zeolite Y show an increased selectivity towards aromatic compounds, which, compared with paraffins, are preferably transformed. This has the effect that the amount of paraffins increases (EP 703003 B1). A disadvantage of this zeolite system is that they have a very low long term stability due to the formation of coke.

A combination of zeolite Y with zeolite Beta was described in U.S. Pat. No. 5,208,197, however, zeolite Beta (BEA) has a very high paraffin selectivity.

The use of a mixture of hydrotreating catalysts and a zeolite mild hydrocracking catalyst is not new. WO93/21284 describes a system where both the hydrotreating catalyst and the cracking catalyst are particulate and are of substantially the same size. The hydrotreating catalyst is a typical Ni—Mo catalyst with the cracking catalyst being a Y-zeolite.

WO98/56876 also describes a bifunctional catalyst for use in high grade diesel fuel production which comprises a hydrotreating catalyst and a zeolite. Beta-zeolites in combination with Co—Mo or Ni—Mo are mentioned.

U.S. Pat. No. 5,500,109 describes a USY zeolite and a Ni—W hydrotreating catalyst to produce cracked hydrocarbons. U.S. Pat. No. 5,208,197 describes the combination of a steam-stabilized form of zeolite Y, known in the art as Y-85, and a form of zeolite beta which has been modified to maximize the weak acid sites and minimize the strong acid sites. It is said to be an effective acidic component of a hydrocracking catalyst for the production of gasoline.

Combinations of various zeolites as catalyst are known, especially in the field of the so-called FCC (Fluid Catalytic Cracking) process where the targets are high yields of light olefins, gasoline and jet fuels and better qualities with respect to octane number and cetane value. U.S. Pat. No. 5,762,902 discloses such a catalyst composition for an FCC process further U.S. Pat. Nos. 4,802,971, 5,308,475 and 4,137,152.

U.S. Pat. No. 5,762,902 discloses a catalyst composition for hydrocracking processes where a combination of a faujasite type zeolite and one zeolite of the TON type selected from the group consisting of Nu-10, THETA-1, KZ-2 or ISI-1 are used. It appears that only this specific selection of TON type zeolites enables the catalytic performance of this composition.

US patent application 2004/0232047 discloses a catalyst comprising at least one matrix and at least one hydro-dehydrogenating element chosen from the group formed by the elements of group VIII and group VIB containing at least one zeolite chosen from the groups formed by specific zeolites not pertaining to any structural group namely ZBM-30, ZFM-48, EU-2, EU-11 and at least one Y zeolite. These specific zeolites are comprised within the ZSM-48 family which have mixed structures and which do not have a proper three-letter code. Therefore, the problem underlying the present invention was in a first aspect to provide a novel catalyst composition which, when used in a catalytic cracking process, can transform different qualities of distilled oils, which contain paraffins and aromatic compounds into final products, which can be used as diesel. Preferably, such a catalyst composition is to be used in a one-step-process and would provide a very good long term stability.

This problem is solved by a catalyst composition, comprising a combination of molecular sieves consisting of at least one zeolite which has a faujasite structure selected from the group consisting of USZ, VUSY, Y, REUSY and REY, at least one fibrous zeolite which comprises essentially non-crossing one-dimensional channels selected from the group consisting of ABW, AEL, AET, AFI, AFO, AHT, ASV, ATN, ATO, ATV, AWO, AWW, BCT, BIK, CAN, CAS, CFI, CHI, CZP, DON, ESV, EUO, GON, IFR, JBW, LAU, LTL, MAZ, MOR, MTF, MTT, MTW, MWW, NES, NPO, OFF, OSI, PAR, PON, RON, RTE, SAS, SFE, SFF, SFH, SFN, SSY, STF, TON, VET, VFI provided that the fibrous zeolite of the structural type TON is not THETA-1, Nu-10, KZ-2 and ISI-1 and further comprising an active amount of a catalytic hydrogenation component. In this context the term "active amount" means an amount necessary to induce a hydrogenation reaction. Impurities and amounts not inducing a hydrogenation reaction are not comprised within the meaning of this term.

The composition according to the invention can be used especially for the mild hydrocracking of oil having a high sulphur content. It is understood, that not only a single zeolite component of different structure may be present in the composition according to the invention, but also mixtures of different zeolites of the same structure. It is important to note in this respect, that these zeolites have to be zeolites of a faujasite structure or with a fibrous zeolite structure.

The present invention thus provides a particular novel zeolite catalyst composition which can be used, to convert a hydrocarbon feedstock into a form suitable for use in diesel without producing large unacceptable amounts of naphtha and gases. It has been surprisingly found that a mixture of zeolite catalysts of the aforementioned particular structure is able to selectively convert the aromatic components of a hydrocarbon feed into paraffins and naphthenes with minimal naphtha production. The mixture of zeolite components of the catalyst according to the invention can be combined in further preferred embodiments with a conventional hydrotreating catalyst to give rise to a catalyst system which is capable of desulphurisation, hydrogenation and hydrocracking in a single step.

The composition according to the invention yields better results in mild hydrocracking reactions as the use of catalysts or catalyst composition according to the prior art which are based, for example, only on zeolites with large pores. The use especially of fibrous zeolites with a one-dimensional channel structure provides not only a much more advantageous product distribution but also an increased catalyst stability. A rapid deactivation, as is for example observed with a zeolite Y of prior art, is avoided by the combination according to the invention with a second zeolite having a structure with one-dimensional channels. Further, coke precursors can be avoided or are rapidly reacted.

In a preferred embodiment of the composition according to the invention, the zeolite with a faujasite structure and/or the fibrous zeolite are at least partly present in the so called H-form, that is, the acidity of the zeolite (zeolite-H) is increased, so that the yield of the conversion of cyclic to non-cyclic paraffins is increased during a mild hydrocracking process. The acidity, however, must be carefully controlled since too much acidity may cause coking, reduced cracking selectivity and catalyst deactivation. Preferably, both the zeolite of the faujasite structure and the fibrous zeolite are in the H-form.

Preferably, only the faujasite (or Y) zeolite is modified and is preferably at least partly, or completely, in the so-called H form or partly, or completely in the ammonium form. It is especially preferably to use a USY zeolite. The faujasite zeolite may have a Si/Al ratio in the range of 1 to 25.

In another preferred embodiment, only the fibrous zeolite is at least partly, or completely, in the H form.

It is further preferred, that the channels of the fibrous zeolites are at least 8-ring-channels, still more preferred at least 10-ring-channels and most preferred at least 12-ring-channels, so that the above described beneficial influence of the fibrous zeolites is further increased. This may increase further the yield of cyclic paraffins into non-cyclic paraffins when used during the mild hydrocracking process.

Preferred fibrous zeolites in the context of the present invention are for example the following, which are designated according to the three-letter-code of the International Zeolite Organisation (for further information see http://www.iza-online.org/:

ABW, AEL, AET, AFI, AFO, AHT, ASV, ATN, ATO, ATV, AWO, AWW, BCT, BIK, CAN, CAS, CFI, CHI, CZP, DON, ESV, EUO, GON, IFR, JBW, LAU, LTL, MAZ, MOR, MTF, MTT, MTW, MWW, NES, NPO, OFF, OSI, PAR, PON, RON, RTE, SAS, SFE, SFF, SFH, SFN, SSY, STF, TON, VET, VFI.

Especially preferred zeolites among this group are structures with 10 or 12 ring channels namely AEL, AFI, AFO, AHT, ASV, ATO, CAN, CZP, EUO, GON, IFR, LAU, LTL, MAZ, MOR, MTT, MTW, NPO, OFF, OSI, PAR, PON, RON, SFE, SFF, SSY, STF, TON, VET.

More preferred are structures, whose smallest and largest pore diameter of the 10 and 12 ring channels respectively differ less than 1.3 Å, namely AFI, ASV, ATO, CAN, IFR, LTL, MAZ, MOR, MTT, MTW, NPO, OFF, OSI, PON, RON, SFF, STF, TON, VET.

Still more preferred are structures whose smallest pore diameter is not lower than 4.6 Å namely AFI, ATO, CAN, IFR, LTL, MAZ, MOR, MTW, OFF, OSI, SFF, STF, TON, VET.

With respect to TON structures it is understood that TON structures according to the present invention do not comprise Nu-10, THETA-1, KZ-2 and ISI-1.

Specifically preferred structures are ZSM-22 and ZSM-12 like MTW.

It is understood, that also the isotopic structures of these zeolites are comprised within the scope of the present invention.

Preferred zeolites with a faujasite structure are for example USY, VUSY, Y, REUY, REY. Most preferred are USY, Y and VUSY. In less preferred embodiments REUSY and REY are used.

The catalyst composition according to the invention contains usually a binder, so that the composition according to the invention can be shaped to heat stable shaped bodies. Both zeolite components can be carried on separate binders but it is preferred to employ a single binder to carry both zeolite species. In principle, any binder which is known to a person skilled in the art and is suitable for the intended use can be used, especially aluminium compounds, silicate materials, zirconium compounds, titanium oxide and their mixtures as well as cement, clay, silica, phosphates, titanium and zirconium phosphates. The binder may form up to 70 wt %, e.g. up to 30 wt % of the hydrocracking catalyst composition.

It is preferred that the binder is an aluminium compound. Non-limiting examples for an aluminium compound are aluminiumoxides ("alu"), boehmite, pseudo-boehmite and mixtures thereof. The shaping occurs by processes essentially known to an artisan, as for example extrusion, strand pressing, compression moulding, etc.

The weight ratio of zeolite of the faujasite structure type to fibrous zeolite may be in the range 1:10 to 10:1, e.g. 1:5 to 5:1, especially 1:2 to 2:1, e.g. approximately 1:1 (e.g. within 5% of 1:1).

In summary, the catalyst composition according to the invention provides considerably better results in mild hydrocracking than the catalysts of the prior art which are based, for example, only on large-pored zeolites.

The use in particular of fibrous zeolites having a one-dimensional channel structure results not only in a significantly more advantageous product distribution but also in an improved catalyst stability. Rapid deactivation such as is to be observed, for example, in a zeolite Y of the prior art is prevented by the combination of zeolites having a one-dimensional channel structure and the zeolite of the faujasite structure type. It is envisaged that coke precursors responsible for deactivation may be avoided or reacted rapidly. The long life of the hydrocracking catalyst of the invention is an important advantage.

As mentioned above the catalyst composition according to the invention contains at least one catalytic active hydrogenation component (also termed as hydrotreating catalyst), which comprises one or more metal components or compounds. Thereby, the aromatic compounds in the starting materials are removed by hydrogenation. Due to the subsequent ring opening reaction of the hydrogenated aromatic compounds, the cetane number is increased.

The active hydrogenation component is selected from metals of group VIB of the periodic table, as for example Cr, Mo, W and group VIII as Co and Ni and mixtures thereof and their compounds, as for example their oxides, sulphates, nitrates, complex compounds and their organic salts. In other less preferred embodiments, noble metals like Pt, Pd, Rn, Rh etc. and their compounds can be used as well. It is understood, that the mentioning of the single metals is not understood as limiting. Organic salts are for examples metal carboxylates like formiates, acetates, oxalates, etc., metal alkoholates/ acetylacetonates and similar compounds and may also comprise complex compounds.

It is especially preferred that the hydrotreating catalyst comprises Ni and W, Ni and Mo or Ni and a mixture of W and Mo compounds. Ni may be provided in its 2+ oxidation state via its nitrate with tungsten being provided via a metatungstate salt, e.g. an ammonium salt. Instead of Ni, Fe may also be used in still further preferred embodiments. The same applies to Co. Combinations of three metals as Ni—Co—Mo are also preferred.

The hydrotreating catalyst may also be supported as is known in the art, e.g. using an inert support such as alumina, silica or silica alumina.

Preferably, the same material is used for the support in the hydrotreating catalyst and for the zeolite catalyst binder. This is for example preferred if heavy gas oil (HGO) shall be transformed.

Especially preferred, both catalyst systems are therefore carried on the same support, i.e. using the same binder. The latter is especially preferred if ultra light gas oil (ULGO) shall be converted.

The amounts of metal present in the hydrotreating catalyst may vary within well known limits. Preferably however the amount of Group VIB component may be in the range of 2 to 50 wt %, e.g. 5 to 20 wt %, and the amount of Group VIII component in the range of 1 to 10 wt %, e.g. 3 to 8 wt % based on the weight of the catalyst composition as a whole (i.e. based on the total weight of hydrotreating and hydrocracking catalyst).

Suitable catalyst loadings therefore include 80:20 to 20:80 wt %, e.g. 70:30 to 30:70 wt % such as 60:40 to 50:50 wt % hydrocracking to hydrotreating catalyst.

As already mentioned in the foregoing, the aromatic compounds are removed from the distillate oils by hydrogenation caused by the metal components (hydrogenation components). Further, the use of such hydrogenation metal components, in particular Ni—W or Ni—Mo components, enables the use of oil feedstocks which have a very high sulphur content. In an especially preferred embodiment, very cheap distillate oils with a sulphur content of up to 3000 ppm can be used. The use of such an oil having a high sulphur content with a nobel metal (like for example Au, Pt or Pd) is extremely disadvantageous due to poisoning of the noble metal which have in general a high affinity towards sulphur.

In summary, a catalyst composition according to the invention has a surprisingly high sulphur tolerance.

The catalyst composition according to the invention provides thus a combination of large pore zeolites having a faujasite structure, as for example zeolite Y, with a fibrous zeolite with a one-dimensional channel structure as for example TON or MTW. In an especially preferred embodiment, the catalyst composition is present in combination with catalytic active metal compounds, as for example transition metal compounds for catalytic hydrogenation like Ni—, Mo—W. This catalyst composition allows to react and transform different distillate oils in a single process step by mild hydrocracking and hydrotreating to a high amount of diesel with the required specifications with regard to cetane number and sulphur content. At the same time, the amount of light products with a boiling point of less than 150° C. is minimized. The fraction with a boiling point of <150° C. is termed in the following as "150° C.–".

The use of a catalyst compound according to the invention in a usual hydrocracking process for sulphur containing distillate oils avoids also the step of prior desulphurization of a destillate oil which would be required upon using noble metal catalysts. A catalyst composition according to the invention offers therefore an effective and cheap possibility to react different distillate oils with a high sulphur content to a high-grade-diesel. Thereby, the end-products obtained according to the one-step-reaction according to the invention may have sulphur contents of less than 10 ppm.

In another aspect, the invention provides the use of a hydrocracking catalyst composition, as described in the foregoing, comprising a zeolite having a faujasite structure; and a fibrous zeolite which substantially comprises non-crossing one-dimensional channels in a hydrocracking process.

The problem of the present invention is in another aspect further solved by a process for the manufacture of a catalyst composition according to the invention wherein the process comprises the steps of:
- a) provision of a zeolite having a faujasite structure and a fibrous zeolite,
- b) mixing with a binder,
- c) formation of shaped bodies, The shaped bodies obtained are dried and calcined.

The steps of drying and calcining may carried out, in particular, as follows:
- i) drying of the shaped bodies at a temperature in a range from 100 to 130° C.,
- ii) calcining the shaped bodies at a temperature in the range from 400 to 600° C.,
- iii) cooling down to room temperature,
- iv) applying a solution of a hydrogenation compound to the calcined catalyst composition.

In this context, the final step of the calcining preferably furthermore comprises the following steps:
- iia) heating in intervals of 1-5° C./min from room temperature to a temperature in the range from 280 to 400° C.,
- iib) maintaining of the temperature over a period of 10 to 20 h,
- iic) heating again in intervals of 1-5° C./min to a temperature in the range from 470 to 530° C.,
- iid) subsequent cooling to room temperature.

The intervals in step iia) are preferably 1-2° C./min, particularly preferably 1° C./min, and the temperature to be reached is 330 to 360° C., in particular 350° C. This temperature is maintained for 15 to 17 h, preferably for 16 h.

The intervals in step iic) of the process according to the invention are preferably 1-2° C./min, particularly preferably 1° C./min, and the temperature to be reached is 480 to 520° C., very particularly preferably 510° C.

In a particularly advantageous embodiment, the calcined catalyst composition can then be treated with a solution, e.g. an aqueous solution, of metal components. The metal components are preferably metal compounds from group VIB and VIII of the periodic table, for example a nickel and a tungsten component.

After the step of application of the metal components, the process according to the invention may furthermore comprises the steps of
- v) drying of the shaped bodies at a temperature in a range from 100 to 130° C.,
- vi) calcining at a temperature in a range from 400 to 500° C.,
- vii) cooling down to room temperature.

This second calcining may further comprise the following specific steps:
- via) heating in intervals of 1-5° C./min from room temperature to a temperature in the range from 180 to 220° C.,
- vib) maintaining of the temperature over a period of 3 to 6 h,
- vic) heating again in intervals of 1-5° C./min to a temperature in the range from 420 to 470° C., followed by subsequent cooling to room temperature.

In still another aspect of the invention, the problem is further solved by a hydrocracking process which comprises contacting a hydrocarbon feedstock with hydrogen and a hydrocracking catalyst composition, said hydrocracking catalyst comprising:
- (I) a zeolite which has a faujasite structure selected from the group consisting of USY, VUSY, Y, REUSY and REY; and
- (II) a fibrous zeolite which substantially comprises non-crossing one-dimensional channels selected from the group consisting of ABW, AEL, AET, AFI, AFO, AHT, ASV, ATN, ATO, ATV, AWO, AWW, BCT, BIK, CAN, CAS, CFI, CHI, CZP, DON, ESV, EUO, GON, IFR, JBW, LAU, LTL, MAZ, MOR, MTF, MTT, MTW, MWW, NES, NPO, OFF, OSI, PAR, PON, RON, RTE, SAS, SFE, SFF, SFH, SFN, SSY, STF, TON, VET, VFI provided that the fibrous zeolite of the structural type TON is not THETA-1, Nu-10, KZ-2 and ISI-1.
- (III) an active amount of a catalytic active hydrogenation compound.

The advantages of the catalyst composition in such a process are described in the foregoing.

The hydrocarbon feedstock on which the catalyst composition described above operates can be any suitable feed, e.g. any distillate oil. Preferably however, the feed comprises light and/or heavy gas oils, (especially straight run light or heavy gas oils of crude oil), vacuum distillates, vacuum gas oil, coker gas oil, light cycle oil and materials which are produced during coking, e.g. delayed coking or fluid catalytic cracking.

The boiling point of the hydrocarbon feedstock may be in the range from 150 to 550° C., in particular 250 to 450° C., preferably 280 to 410° C. The density of the hydrocarbon feedstock may be greater than 845 kg/m³, e.g. greater than 870 kg/m³.

Where the hydrocracking catalyst is being used in the absence of a hydrotreating catalyst, it may be necessary to hydrogenate the feedstock prior to its entry into the hydrocracking reactor.

The mild hydrocracking and ring opening process can be carried out in a known hydrocracking reactor, and is preferably for the mild hydrocracking and ring opening of atmospheric and vacuum distillates. FIG. 12 shows an exemplary reactor set up.

The catalyst system can be present in a single bed or the hydrotreating catalyst may be present in a separate bed from the zeolite components. The person skilled in the art is able to manipulate the reactor set up to suit his needs. Hydrogen is added to the reactor to effect both hydrogenation of the feedstock and to allow its desulphurisation.

Preferably, during the process of the invention, the aromatic components in the hydrocarbon feedstock are hydrogenated by the hydrotreating catalyst. Such a hydrotreating catalyst can also be used in the presence of feedstocks of very high sulphur content. This is not possible when hydrogenation catalysts containing noble metals, such as Au, Pt or Pd are used. The catalyst composition therefore has a particularly high sulphur tolerance.

Moreover, the hydrocracking catalyst composition when used in a process as claimed herein also acts as to remove sulphur from the feedstock. Sulphur contents in the hydrocarbon product stream which exits the hydrocracking reactor can be less than 50 ppm, e.g. less than 20 ppm, especially less than 10 ppm. The amount of sulphur present in the hydrocarbon product stream can be reduced by increasing the cracking temperature.

The use of the catalyst composition in a conventional hydrocracking process to crack sulphur-containing feedstocks thereby also advantageously avoids the need for prior desulphurization of the feedstock which would otherwise need to be carried out separately. Such a step would be unavoidable if noble metal catalysts were used. The catalyst composition according to the invention thus offers an inexpensive way of converting various hydrocarbon feedstocks into high-grade diesel fuel.

The hydrocracking catalyst composition of the invention also effects denitrogenation of the feedstock. For straight-run HGO as an example, the nitrogen levels in the feedstock may be of the order of 250 ppm which reduces to less than 2 ppm after hydrocracking.

The combination of large-pored zeolites having a faujasite structure with fibrous zeolites having a 1-dimensional channel structure, such as, for example, TON or MTW, preferably in combination with the hydrotreating catalyst, such as Ni—W, also ensures that the cetane number of the cracked hydrocarbon feedstock is increased whilst minimizing the content of light products having a boiling point of <150° C.

The process of the invention is carried out under conventional cracking conditions. The hydrocarbon feedstock is contacted with hydrogen in the presence of the catalyst system preferably at a temperature of from 250 to 500° C., preferably 300 to 450° C., especially 350 to 400° C. The pressure is preferably at least 10 bar, e.g. 50 to 150 bar, such as 60 to 120 bar, e.g. 70 to 80 bar. Suitable hydrogen to oil ratios may be at least 75 Nl/l, e.g. 100 to 1500 Nl/l, preferably 500 to 1000 Nl/l. (The unit Nl/l represents normal liter hydrogen at 0° C. and 1 atm pressure per liter oil). The liquid hourly space velocity (LHSV) may be between 0.3 to 5/h, e.g. 0.5 to 2/h, such as 0.5 to 1.5/h, especially less than l/h.

The catalyst can be regenerated by conventional techniques, e.g. by burning off any coke which forms on the catalyst composition.

After the process of the invention, the boiling point of the majority (i.e. at least 50 wt %) of the hydrocarbon product stream, i.e. the cracked feedstock, should be in the range from 150 to 360° C. Preferably, at least 90% of the product stream, especially 95% of the product stream is formed from hydrocarbons having a boiling point below 395° C., preferably below 360° C.

The amount of naphtha component (i.e. liquid components boiling below 150° C.) produced during the process should be less than 40% wt, preferably less than 30% wt, especially less than 15% wt, most especially less than 10 wt % of the cracked product. Such naphtha can of course be isolated and used as is known in the art.

The amount of hydrocarbon gas produced (i.e. C1-C4 fraction) is also minimised, e.g. to less than 5 wt %. Again, these gaseous products can be isolated and used as is known in the art.

The density of the hydrocarbon product stream is preferably less than 845 kg/m$^3$. Whilst the density can be reduced further by increasing the temperature of the cracking process this also results in increased naphtha production.

Where a heavy gas oil is the feedstock, the amount of monoaromatics in the product stream can be reduced to less than 15 wt %, the amount of diaromatics to less than 2 wt % and the amount of triaromatics to less than 0.5 wt % using the process of the invention. The total aromatic content may therefore reduced to less than 17.5 wt %.

In addition, the naphthenes content of the product stream (i.e. cyclic aliphatic hydrocarbon content) may be greater than 45 wt %.

The cetane number of the product stream is preferably greater than 51, especially greater than 55.

The product stream can be fractionated or passed to further reactors for further treatment as is desired. It is also possible to recycle heavy fractions back into the hydrocracker. Preferably however, the hydrocarbon product stream is suitable for direct use in automotive diesel.

In still another aspect, the invention provides therefore a hydrocarbon feedstock hydrocracked by the process as hereinbefore described.

The invention will now be described with reference to the following non-limiting examples and figures.

FIGURES

In the following, some preferred embodiments are illustrated by way of figures and drawings without being understood as limiting the scope of the invention.

EXAMPLE 1

Figure 1:
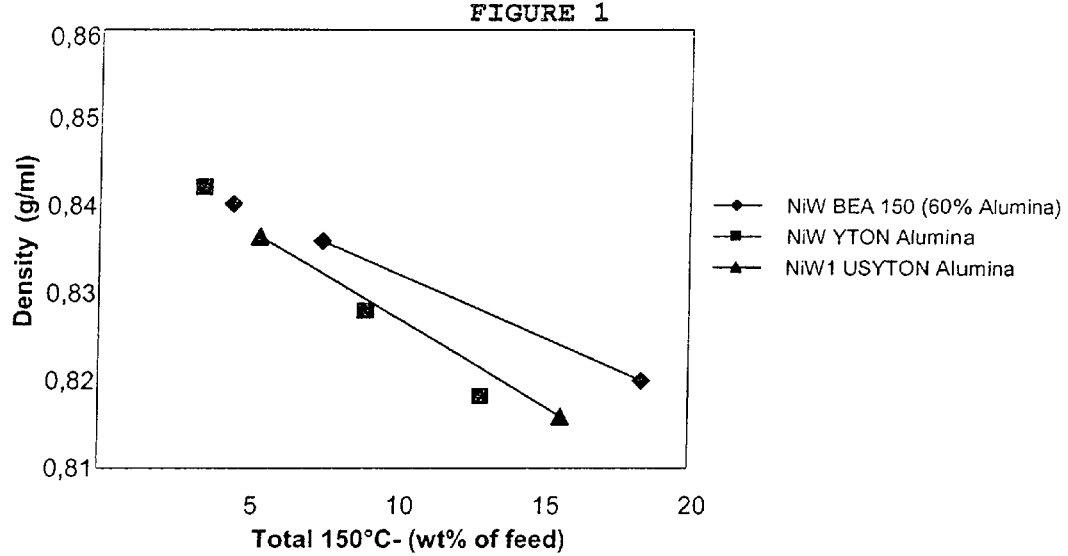
FIG. 1 is a diagram which illustrates the results from comparing catalyst compositions Ni—W/Y-TON and Ni—W/USY-TON according to the invention with regard to Ni—W/BEA-150 upon the reaction with ultra light gas oil (ULGO)

Catalyst According to the Invention Comprising Zeolite USY (Modified Y Zeolite) and Zeolite ZSM-22 (TON Structure Type)

1.1 Preparation of the Support:
Synthesis of the Catalyst Support (CBV760+ZSM-22, 24% Al$_2$O$_3$) by Extrusion:

153 g of zeolite USY (CBV 760 from Zeolyst) and 170 g of HZSM-22 (from Süd-Chemie, ratio of SiO$_2$/Al$_2$O$_3$=70) were mixed for 15 min in a kneader with 79.72 g of commercially available pseudoboehmite as a binder and 26.80 g of commercially available α-aluminium dioxide with the addition of 100.78 g of demineralized water, and the mixture was processed to a plastic mass by addition of 29.59 g of concentrated acetic acid and 175 g of demineralized water. The mass was kneaded for a further 10 min and 22.60 g of mould release oil (steatite oil) were then added. The mass was subsequently extruded to shaped bodies (d=1/16"). The shaped bodies were dried in air at 120° C. for 16 h and then calcined in air. For this, the shaped bodies were first heated to 350° C. at a heating rate of 1° C./min and kept at this temperature for 16 h. The temperature was then increased to 510° C. with a heating rate of 1° C./min and the shaped bodies were kept at this temperature for 15 h. The shaped bodies were cooled to room temperature and then comminuted to an average size of 3 mm. The catalyst support had the chemical and physical properties stated in Table 1:

TABLE 1

Chemical and physical properties of Ex 1.1

| | | | Ex. No.: 1.1 |
|---|---|---|---|
| Format | | | 1/16" extrudates |
| Binder | | | Al$_2$O$_3$ |
| Binder content | | (wt. %) | 24 |
| LOI | | (wt. %) | 3.7 |
| Na | a) | (ppm by wt.) | n. determ. |
| C | a) | (ppm by wt.) | n. determ. |
| CS-AVE | b) | (kp/3 mm) | 1.9 |
| CS-MIN | | (kp/3 mm) | 0.9 |
| CS-MAX | | (kp/3 mm) | 2.8 |
| PV-Hg | d) | (cm$^3$/g) | 0.44 |
| PSD: | | | |
| >1,750 nm | | (wt. %) | 0.89 |
| 1,750-80 nm | | (wt. %) | 9.53 |
| 80-14 nm | | (wt. %) | 73.3 |
| 14-7.5 nm | | (wt. %) | 16.28 |
| BET (Surface Area) | c) | (m$^2$/g) | 361 |

LOI = loss on ignition at 100° C.
PSD = pore size distribution
a) based on LOI (loss on ignition = loss after calcining at 1,000° C.)
b) crushing strength (CS) of 50 shaped pieces (AVE = average, Min = minimum, Max = maximum)
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

1.2 Preparation of the Catalyst:
Synthesis of the Ni—W Form by the Method of Incipient Wetness to Form (Ni—W/CBV760+ZSM-22, 24% Al$_2$O$_3$)

Ammonium metatungstate was dissolved in ½ the water pore volume of the support, while stirring and heating gently (approx. 40° C.). After the tungstate solution had cooled to room temperature, Ni(NO$_3$)$_2$*6H$_2$O was added and the solution was diluted with water to the pore volume. The solution was added to the support in a plastic vessel, the vessel was then closed and the liquid was distributed homogeneously over the support by shaking. The support was introduced into a porcelain vessel and dried in a drying oven at 120° C. for 16 h and calcined in air in an oven. For this, the shaped bodies were first heated to 200° C. at a heating rate of 1° C./min and kept at this temperature for 5 hours. The temperature was then heated to 450° C. with a heating rate of 1° C./min and the shaped bodies were kept at this temperature for 5 hours and finally cooled again to room temperature.

Amount weighed out: 100 g Ex 1.1 (CBV760+ZSM-22, 24% aluminium dioxide binder, water pore volume=58 ml/100 g extrudates, LOI$_{1,0000° C.}$ 3.7%), 27.01 g ammonium metatungstate, 29.82 g Ni(NO$_3$)$_2$*6H$_2$O.

TABLE 2

Chemical and physical properties of Ex 1.2:

| | Based on LOI | | Without taking into account LOI |
|---|---|---|---|
| LOI (%) | | | 8.7 |
| Na [ppm] | 80 | a) | 74 +/− 20 |
| Ni (wt. %) | 4.7 | a) | 4.3 +/− 0.3 |
| W (wt. %) | 15.0 | a) | 13.8 +/− 0.5 |
| C [ppm] | 239 | a) | 220 +/− 30 |
| Fe (ppm) | n. determ. | | |
| BET (Surface Area) (m$^2$/g) | 227 | c) | |
| PV Hg (cm$^3$/g) | 0.29 | d) | |
| CS-AVE (kp/3 mm) | 4.6 | b) | |
| CS-Min(kp/3 mm) | 2.5 | | |
| CS-Max(kp/3 mm) | 8 | | |
| PSD: (wt. %) | | | |
| >1,750 nm | 0.75 | | |
| 1,750-80 nm | 9.76 | | |
| 80-14 nm | 82.82 | | |
| 14-7.5 nm | 6.41 | | |

LOI: loss on ignition at 600° C.
PSD = pore size distribution
a) based on LOI (loss on ignition = loss after calcining at 1,000° C.)
b) crushing strength (CS) of 50 shaped pieces (AVE = average, Min = minimum, Max = maximum)
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

EXAMPLE 2

Catalyst According to the Invention Comprising Zeolite Y and ZSM-22 (TON Structure Type)

2.1 Preparation of the Support:
Synthesis of CBV500+ZSM-22, 24% Aluminium Oxide (Al$_2$O$_3$) by Extrusion:

128.57 g of zeolite Y (CBV 500 from Zeolyst) and 136.53 g of H-ZSM-22 from Süd-Chemie were mixed for 15 min in a kneader with 68.44 g of commercially available pseudoboehmite as a binder and 21.54 g of commercially available α-aluminium dioxide with the addition of 82.71 g of demineralized water, and the mixture was processed to a plastic mass by addition of 24.99 g of concentrated acetic acid and 165 g of demineralized water. The mass was kneaded for a further 10 min and 18.55 g of mould release oil (steatite oil) were then added. The mass was then extruded to shaped bodies (d=1/16"). The shaped bodies were dried in air at 120° C. for 16 h and then calcined in air. For this, the shaped bodies were first heated to 350° C. at a heating rate of 1° C./min and kept at this temperature for 16 h. The temperature was then increased to 510° C. with a heating rate of 1° C./min and the shaped bodies were kept at this temperature for 15 h. The shaped bodies were cooled to room temperature and then comminuted to an average size of 3 mm. The catalyst support had the chemical and physical properties stated in Table 3.

TABLE 3

Chemical and physical properties of Ex 2.1

| | | | Ex No.: 2.1 |
|---|---|---|---|
| Formats | | | 1/16" extrudates |
| Binder | | | Al$_2$O$_3$ |
| Binder content | | (wt. %) | 24 |
| LOI | | (wt. %) | 7.9 |
| Na | a) | (ppm by wt.) | n. determ. |
| C | a) | (ppm by wt.) | n. determ. |

TABLE 3-continued

Chemical and physical properties of Ex 2.1

Ex No.: 2.1

| | | | |
|---|---|---|---|
| CS-AVE | b) | (kp/3 mm) | 1.9 |
| CS-MIN | | (kp/3 mm) | 1.1 |
| CS-MAX | | (kp/3 mm) | 3.0 |
| PV-Hg | d) | (cm$^3$/g) | 0.48 |
| PSD: | | | |
| >1,750 nm | | (wt. %) | 0.15 |
| 1,750-80 nm | | (wt. %) | 14.56 |
| 80-14 nm | | (wt. %) | 76.37 |
| 14-7.5 nm | | (wt. %) | 8.92 |
| BET (Surface Area) | c) | (m$^2$/g) | 348 |

LOI: loss on ignition at 600° C.
PSD = pore size distribution
a) based on LOI at 1,000° C.
b) crushing strength (CS) of 50 shaped pieces
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

2.2 Preparation of the Catalyst:
Synthesis of the Ni—W Form by the Method of Incipient Wetness to Form (Ni—W/CBV500+ZSM-22, 24% Aluminium Dioxide).

Ammonium metatungstate was dissolved in ½ the water pore volume of the support, while stirring and heating gently (approx. 40° C.). After the tungstate solution had cooled to room temperature, Ni(NO$_3$)$_2$*6H$_2$O was added and the solution was diluted with water to the pore volume. The solution was added to the support in a plastic vessel, the vessel was then closed and the liquid was distributed homogeneously over the support by shaking. The support was introduced into a porcelain vessel and dried in a drying oven at 120° C. for 16 h and calcined in air in an oven as in Example 1.

Amount weighed out: 100 g Ex 2.1 [CBV500+ZSM-22, 24% aluminium dioxide, water pore volume=58.1 ml/100 g extrudates, LOI$_{1,000° C.}$ 7.9%], 25.83 g ammonium metatungstate, 28.52 g Ni (NO$_3$)$_2$*6H$_2$O.

TABLE 4

Chemical and physical properties of Ex 2.2

| | Based on LOI | | Without taking into account LOI |
|---|---|---|---|
| LOI (%) | | | 11.4 |
| Na [ppm] | 257 | a) | 240 +/− 30 |
| Ni (wt. %) | 4.7 | a) | 4.2 +/− 0.3 |
| W (wt. %) | 14.8 | a) | 13.3 +/− 0.5 |
| C [ppm] | 334 | a) | 300 +/− 30 |
| Fe (ppm) | n. determ. | | |
| BET (Surface Area) (m$^2$/g) | 224 | c) | |
| PV Hg (cm$^3$/g) | 0.32 | d) | |
| CS-AVE(kp/3 mm) | 5.4 | b) | |
| CS-Min(kp/3 mm) | 3.1 | | |
| CS-Max(kp/3 mm) | 8.3 | | |
| PSD: (wt. %) | | | |
| >1,750 nm | 0 | | |
| 1,750-80 nm | 16.58 | | |
| 80-14 nm | 80.72 | | |
| 14-7.5 nm | 2.7 | | |

LOI: loss on ignition at 600° C.
PSD = pore size distribution
a) based on LOI (loss on ignition = loss after calcining at 1,000° C.)
b) crushing strength (CS) of 50 shaped pieces (AVE = average, Min = minimum, Max = maximum)
c) five-point method; p/p0 = 0.004-0.14/preconditioning: 350° C./vacuum (DIN 66131)
d) PV = pore volume, determined via Mg porosimetry at a maximum pressure of 2000 bar (DIN 66133)

EXAMPLE 3

Catalyst According to the Invention Comprising Zeolite Y and ZSM-12 (MTW Structure Type)

3.1 Preparation of the Support:
Synthesis of (CBV500+ZSM-12, 24% Al$_2$O$_3$) by extrusion:

119.36 g of zeolite Y (CBV 500 from Zeolyst) and 127.25 g of H-ZSM-12 (ratio SiO$_2$/Al$_2$O$_3$ in the range of 50 to 150, size of crystallites: ≦0.1 μm) were mixed for 15 min in a kneader with 61.40 g of commercially available pseudoboehmite as a binder and 19.95 g of commercially available α-aluminium dioxide with the addition of 76.94 g of demineralized water, and the mixture was processed to a plastic mass by addition of 22.60 g of concentrated acetic acid and 151 g of demineralized water. The mass was kneaded for a further 10 min and 17.26 g of mould release oil (steatite oil) were then added. The mass was then extruded to shaped bodies (d=1/16"). The shaped bodies were dried in air at 120° C. for 16 h and then calcined in air. For this, the shaped bodies were first heated to 350° C. at a heating rate of 1° C./min and kept at this temperature for 16 h. The temperature was then increased to 510° C. with a heating rate of 1° C./min and the shaped bodies were kept at this temperature for 15 h. The shaped bodies were cooled to room temperature and then comminuted to an average size of 3 mm. The catalyst support had the chemical and physical properties stated in Table 5.

TABLE 5

Chemical and physical properties of Ex 3.1

Ex No.: 3.1

| | | | |
|---|---|---|---|
| Formats | | | 1/16" extrudates |
| Binder | | | alumina |
| Binder content | | (wt. %) | 24 |
| LOI | | (wt. %) | 10.3 |
| Na | a) | (ppm by wt.) | n. determ. |
| C | a) | (ppm by wt.) | n. determ. |
| CS-AVE | b) | (kp/3 mm) | 2.3 |
| CS-MIN | | (kp/3 mm) | 1.4 |
| CS-MAX | | (kp/3 mm) | 3.4 |
| PV-Hg | d) | (cm$^3$/g) | 0.43 |
| PSD: | | | |
| >1,750 nm | | (wt. %) | 0.51 |
| 1,750-80 nm | | (wt. %) | 50.37 |
| 80-14 nm | | (wt. %) | 24.24 |
| 14-7.5 nm | | (wt. %) | 24.88 |
| BET (Surface Area) | c) | (m$^2$/g) | 424 |

LOI: loss on ignition at 600° C.
PSD = pore size distribution
a) based on LOI at 1,000° C.
b) crushing strength (CS) of 50 shaped pieces
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

3.2 Preparation of the Catalyst:
Synthesis of the Ni—W Form by the Method of Incipient Wetness to Form (Ni—W/CBV500+ZSM-12, 24% Al$_2$O$_3$).

Ammonium metatungstate was dissolved in ½ the water pore volume of the support, while stirring and heating gently (approx. 40° C.). After the tungstate solution had cooled to room temperature, Ni(NO$_3$)$_2$*6H$_2$O was added and the solution was diluted with water to the pore volume. The solution was added to the support in a plastic vessel, the vessel was then closed and the liquid was distributed homogeneously over the support by shaking. The support was introduced into a porcelain vessel and dried in a drying oven at 120° C. for 16 h and calcined in air in an oven under continuous absorption with the following temperature programme: 1° C./min-200° C./5 h and 1° C./min-450° C./5 h.

Amount weighed out: 100 g Ex 3.1 [CBV500+ZSM-12, 24% aluminium dioxide binder, water pore volume=53 ml/100 g extrudates, $LOI_{1,000°\ C.}$ 10.3%], 23.80 g ammonium metatungstate, 27.77 g $Ni(NO_3)_2*6H_2O$.

TABLE 6

Chemical and physical properties of Ex 3.2

|  | Based on LOI | | Without taking into account LOI |
| --- | --- | --- | --- |
| $LOI_{600°\ C.}$ (%) |  |  | 9.7 |
| Na [ppm] | 290 | a) | 260 +/− 30 |
| Ni (wt. %) | 4.7 | a) | 4.2 +/− 0.1 |
| W (wt. %) | 14.5 | a) | 13.1 +/− 0.2 |
| C [ppm] | 240 | a) | 220 +/− 30 |
| Fe [ppm] | n. determ. |  |  |
| BET (Surface Area) (m²/g) | 282 | c) |  |
| PV Hg (cm³/g) | 0.29 | d) |  |
| CS-AVE(kp/3 mm) | 4.7 | b) |  |
| CS-Min(kp/3 mm) | 2.8 |  |  |
| CS-Max(kp/3 mm) | 7.0 |  |  |
| PSD: (wt. %) |  |  |  |
| >1,750 nm | 0.07 |  |  |
| 1,750-80 nm | 56.24 |  |  |
| 80-14 nm | 29.03 |  |  |
| 14-7.5 nm | 14.66 |  |  |

LOI = loss on ignition at 100° C.
PSD = pore size distribution
a) based on LOI (loss on ignition = loss after calcining at 1,000° C.)
b) crushing strength (CS) of 50 shaped pieces (AVE = average, Min = minimum, Max = maximum)
c) five-point method; p/p0 = 0.004-0.14/preconditioning: 350° C./vacuum (DIN 66131)
d) PV = pore volume, determined via Hg porosimetry at a maximum pressure of 2000 bar (DIN 66133)

The catalysts according to the invention were tested with the catalysts from the prior art according to the comparison examples.

COMPARATIVE EXAMPLE 1

Preparation of (BEA150, 60% $Al_2O_3$) (Shaped Bodies of Zeolite BEA by Extrusion)

150 g of zeolite H-BEA with $SiO_2/Al_2O_3$=150 were mixed for 15 min in a kneader with 286 g of commercially available pseudoboehmite as a binder, with the addition of 47 g of demineralized water, and the mixture was processed to a plastic mass by addition of 79.4 g of concentrated acetic acid and 250 g of demineralized water. The mass was kneaded for a further 10 min and 10.5 g of mould release oil (steatite oil) were then added. The mass was then extruded to shaped bodies (d=1/16″). The shaped bodies were dried in air at 120° C. for 16 h and then calcined in air. For this, the shaped bodies were heated to 550° C. at a heating rate of 1° C./min and kept at this temperature for 8 h. The shaped bodies were subsequently cooled to room temperature and then comminuted to an average size of 3 mm.

The preparation of the catalyst (Ni—W/BEA150, 60% $Al_2O_3$) was carried out with the support by loading with Ni—W as in the preceding examples.

Amount weighed out: 100 g Comp 1.1 (BEA 150, 60% aluminium dioxide binder, water pore volume=46.3 ml/100 g extrudates, $LOI_{1,000°\ C.}$ 9.7%), 25.33 g ammonium metatungstate, 27.96 g $Ni(NO_3)_2*6H_2O$.

COMPARATIVE EXAMPLE 2

Preparation of Shaped Bodies of Zeolite Y (CBV 500, 24% $Al_2O_3$, Faujasite Structure) by Extrusion 300 g of zeolite Y (CBV 500 of Zeolyst) mixed for 15 m in a kneader with 66.49 g of commercially available pseudoboehmite as binder and 21.52 g of commercially available alpha-alumina with the addition of 93.6 g of demineralised water and the mixture was processed by addition of 24.45 g of concentrated acetic acid and 200 g of demineralised water to a plastic mass. The mass was kneaded for further 10 min and 20.99 g mould release oil (steatite oil) were added. The mass was then extruded to shape the bodies (d=1/16″). The shaped bodies were dried in air at 120° C. for 16 h and then calcined in air. The shaped bodies were heated with a heating rate of 1° C./min to 200° C. and kept for 5 h at this temperature. Subsequently, the temperature was increased with a heating rate of 1° C./min to 520° C. and the shaped bodies were kept for 5 h at this temperature. The shaped bodies were cooled to room temperature and then comminuted to an average size of 3 mm.

The preparation of the catalyst (Ni—W/CBV500, 24% $Al_2O_3$) was carried out with the support by addition of nickel and tungsten as in the foregoing examples:

Amount weight-out: 100 g Comp 2.1 (CBV 500, 24% $Al_2O_3$), water pore volume=46.5 ml/100 g extrudates, $LOI_{1000°\ C.}$ 20.0%), 22.44 g ammoniummetatungstate, 24.77 g $Ni(NO_3)_2*6H_2O$.

COMPARATIVE EXAMPLE 3

Preparation of Shaped Bodies from Zeolite Y (Faujasite Structure) and Zeolite BEA (CBV500+BEA150, 24% $Al_2O_3$) by Extrusion 197.37 g of zeolite y (CBV500 of the company Zeolyst) and 210.08 g zeolite H-BEA with $SiO_2/Al_2O_3$=150 were kneaded in a kneader with 102.75 g of commercially available pseudoboehmite as binder and 33.26 g of commercially available alpha-aluminiumdioxide under addition of 127.12 demineralised water and further processed to a plastic mass by addition of 37.78 g concentrated acetic acid and 202 g demineralised water. The mass was kneaded for further 10 min and then 28.51 g of mould release oil (steatite oil) was added. The mass was then extruded to shaped bodies (d=1/16″). The shaped bodies were dried in air at 120° C. for 12 h and then calcined in air. The shaped bodies were heated with a heating rate of 1° C./min to 540° C. and kept for 8 h at this temperature. The shaped bodies were cooled to room temperature and then comminuted to an average size of 3 mm.

The preparation of the catalyst (Ni—W/CBV500+BEA150, 24% $Al_2O_3$)) was carried out with the support by addition of Ni—W as in the foregoing examples.

Amount weight-out: 150 g Comp 3.1 (CBV500+BEA150, 24% aluminium dioxide binder, water pore volume=59 ml/100 g extrudates $LOI_{1000°\ C.}$ 2.3%) 38.89 g ammonium-metatungstate (amount of $WO_3$: 89.1%), 45.38 g $Ni(NO_3)_2*6H_2O$.

Test Results:

FIG. 1 shows a diagram which represents the results in comparing catalysts according to the invention, namely Ni—W/Y-TON and Ni—W/USY-TON with respect to Ni—W/BEA150 upon reaction of the feedstock ULGO (ultralight gas oil).

In the diagram the density of a liquid total product (total liquid density) is represented as a function of the loss of yield (total 150° C.−). Only small differences between both catalysts according to the invention, namely Ni—W/Y-TON and Ni—W/USY-TON compared to a catalyst of the comparative example Ni—W/BEA150 was observed, i.e., for all three catalysts a significant decrease in the density of the liquid total product was observed with an increase in temperature and thereby an increasing amount of the naphtha fraction (total 150° C.–), which cannot be used as diesel. However, the catalyst Ni—W/BEA150 showed a decrease in density of the liquid total product due to the formation of light products by cracking the side-chains of alkylsubstituted aromatic compounds which influences the density of the liquid total product but not the gas oil density.

Figure 2:
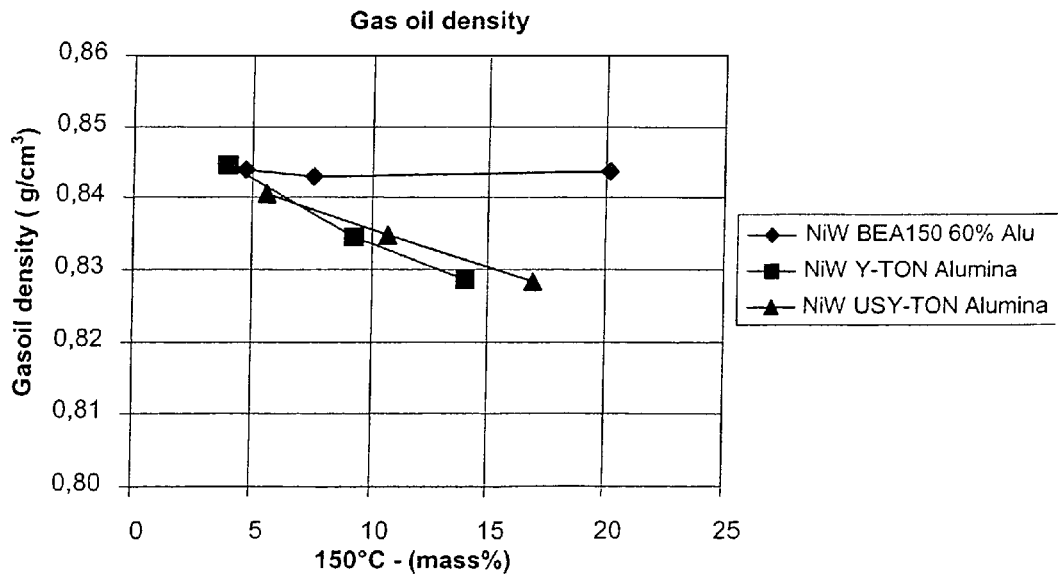
FIG. 2 shows a comparison of the gas oil density in using the catalyst of FIG. 1.

FIG. 2 shows a comparison of the gas oil density upon use of the catalysts shown in FIG. 1. In the diagram, the gas oil density is shown as a function of the amount of light naphtha products. As can clearly be seen, the catalysts according to the invention show better results compared to the catalysts of the prior art. The aim of the reaction was a remarkable decrease of the gas oil density to use the starting material (feed) as diesel without forming too many light products (naphtha 150° C.–) during the reaction. This was achieved by the use of a catalyst according to the invention, but not with the catalyst of the comparative example. By the combination of the hydrogenation of aromatic compounds and subsequent ring-opening reaction with the catalysts according to the invention, an obvious decrease of a gas oil density was obtained without a considerable increase of the amount of light naphtha.

Figure 3:
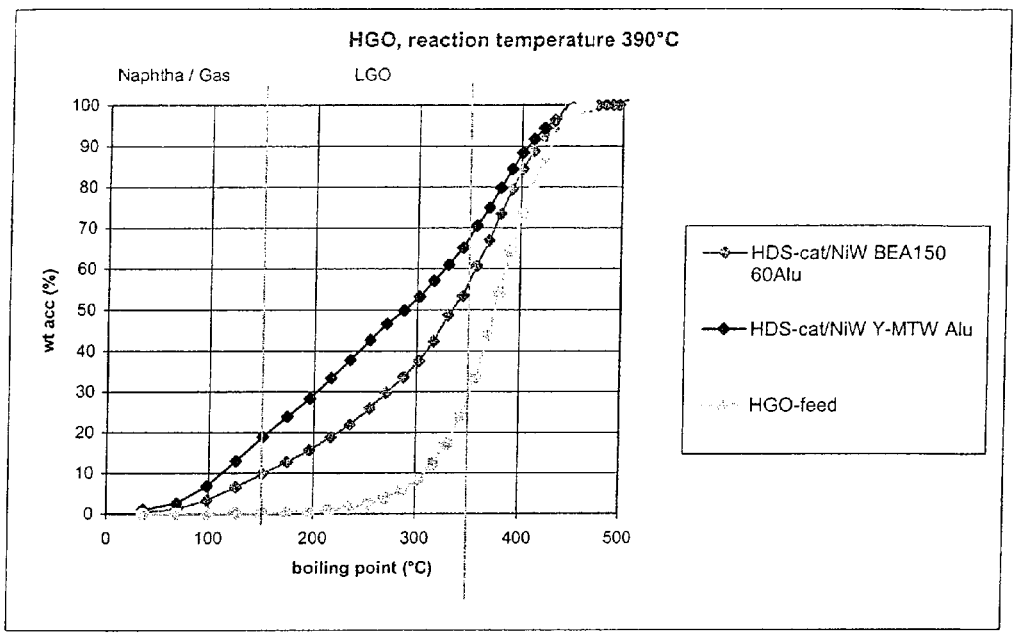
FIG. 3 is a diagram which shows the results of the reaction of the starting material HGO (heavy gas oil) with catalysts according to the invention compared to the catalyst Ni—W/BEA-150 in prior art.

FIG. 3 is a diagram wherein the results of the reaction of the starting material HGO (heavy gas oil) with catalysts according to the invention Ni—W/Y-MTW compared to the catalysts in prior art Ni—W/BEA-150 (Comparative Example 1) are shown.

The reaction of HGO showed in the case of the catalyst Ni—W/Y-MTW, alu a remarkably higher yield of a product with a boiling point in the range of LGO (light gas oil) (150° C.-350° C./diesel) compared to the catalyst Ni—W/BEA150, 60% alumina. (In HGO reactions, a further HDS (hydrodesulphurization) catalyst is used up stream of the catalyst.)

Figure 4:
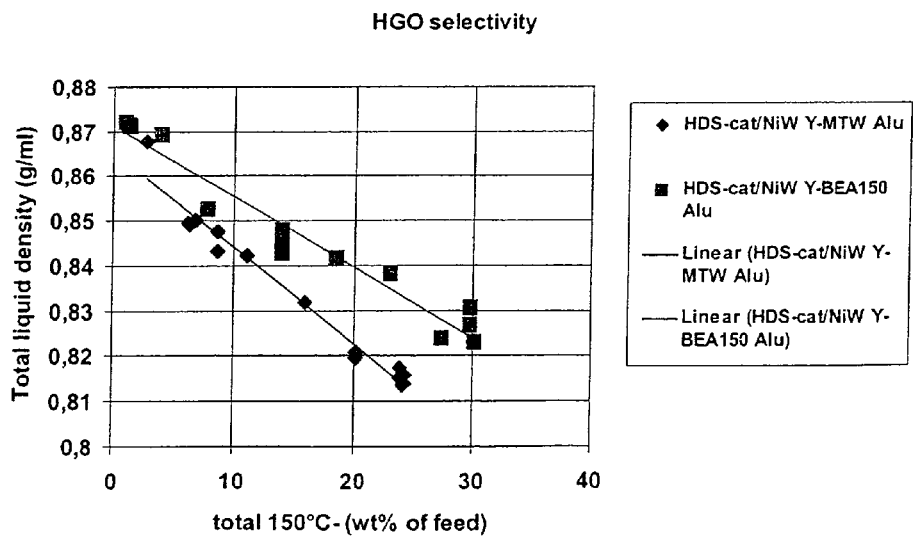
FIG. 4 is a diagram which shows the reaction of the starting material HGO (heavy gas oil) upon using a catalyst according to the invention compared to a catalyst Ni—W/Y-BEA-150.

FIG. 4 shows a diagram, which represents the reaction of the starting material HGO (heavy gas oil) in using a catalyst according to the invention compared to the catalyst Ni—W/Y-BEA150, wherein the density of the liquid total product is shown as a function of the amount of lighter naphtha products. The reduction of the density of the liquid total product should only be the result of an aromatic saturation and not the result of the formation of naphtha, since naphtha as well as gas would result in a loss in the yield of diesel and consumption of hydrogen without an improvement in the cetane number. Therefore, a minimum value of the density of the liquid total product together with a minimum of naphtha and gas is the result which is desired most.

The diagram shows a maximum reduction of the density of the liquid total product (HGO density 0.8867 g/ml) combined with a minimum value of the yield of naphtha/gas for the catalyst HDS-cat/Ni—W/Y-MTW, alu. The catalyst HDS-cat/Ni—W/Y-BEA150, alu is less selective for the transformation of HGO with an increasingly higher loss in the yield with the same decrease in the density of the liquid total product.

Figure 5:
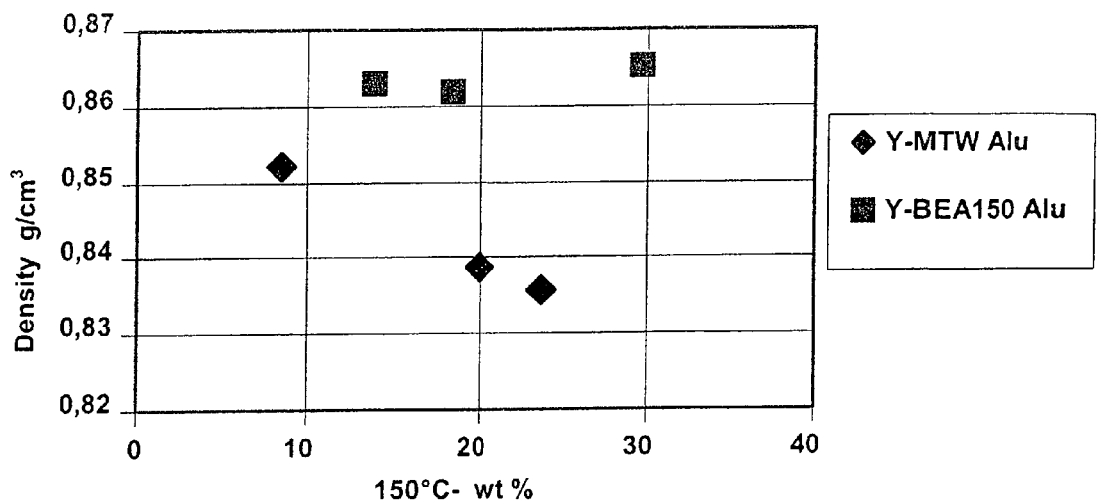
FIG. 5 is a diagram where the gas oil density is shown as a function of the yield of naphtha and gas (Gew % 150° C.–) of a catalyst according to the invention (Ni—W/Y-MTW, Alu) and a catalyst in prior art (Ni—W/Y-BEA 150, Alu)

FIG. 5 shows a diagram which represents the gas oil density as a function of the yield of naphtha and gas (wt % 150° C.–) for a catalyst according to the invention (Ni—W/Y-MTW, alu) compared to a catalyst in prior art (Ni—W/Y-BEA150, alu).

Compared with the density of the liquid total product, the density of the gas oil fraction produced by Ni—W/Y-BEA150, alu remains nearly constant. This means that nearly no saturation of the aromatic compounds took place. The reactivity of Y-BEA150 catalyst is defined by the BEA component, i.e., by the side-chain hydrocracking of substituted aromatic compounds and paraffins. These reactions influence the density of the gas oil fraction only to a very small amount. A high selectivity, i.e. ring-opening of saturated aromatic compounds and mild hydrocracking with a restricted side-chain cracking was observed with the catalyst composition Ni—W/Y-MTW, alu according to the invention.

Figure 6:
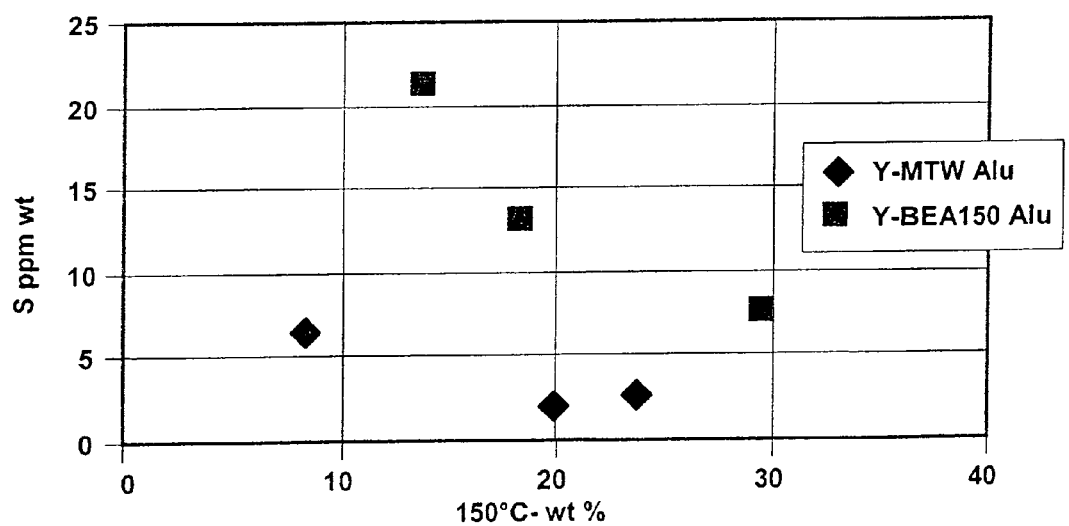
FIG. 6 is a diagram for the desulphurisation activity of a catalyst according to the invention (Y-MTW, Alu) with respect to a catalyst in prior art (Y-BEA150, Alu)

FIG. 6 shows a diagram for the desulphurization activity (hydrodesulphurization, HDS) of a catalyst according to the invention (Y-MTW, alu) compared to a catalyst of the prior art (Y-BEA150, alu) with a sulphur content of S=2557 wtppm as a function of the yield of naphtha and gas (wt % 150° C.–).

The diagram shows that a very good hydrodesulphurization was obtained with a combination of a commercially available HDS catalyst with Ni—W/Y-MTW, alu with respect to the sulphur content in the gas oil fraction which is below 10 wtppm together with a limited formation of light products (<10 wt %). This results in a high desulphurization rate of 99.8%. In the case of the catalyst according to the prior art, Ni—W/Y-BEA150, alu, together with the commercially available HDS catalyst, the criterion of a sulphur content of below 10 wtppm is only obtainable in combination with a higher yield (>25 wt % on naphtha and gas).

Figure 7:
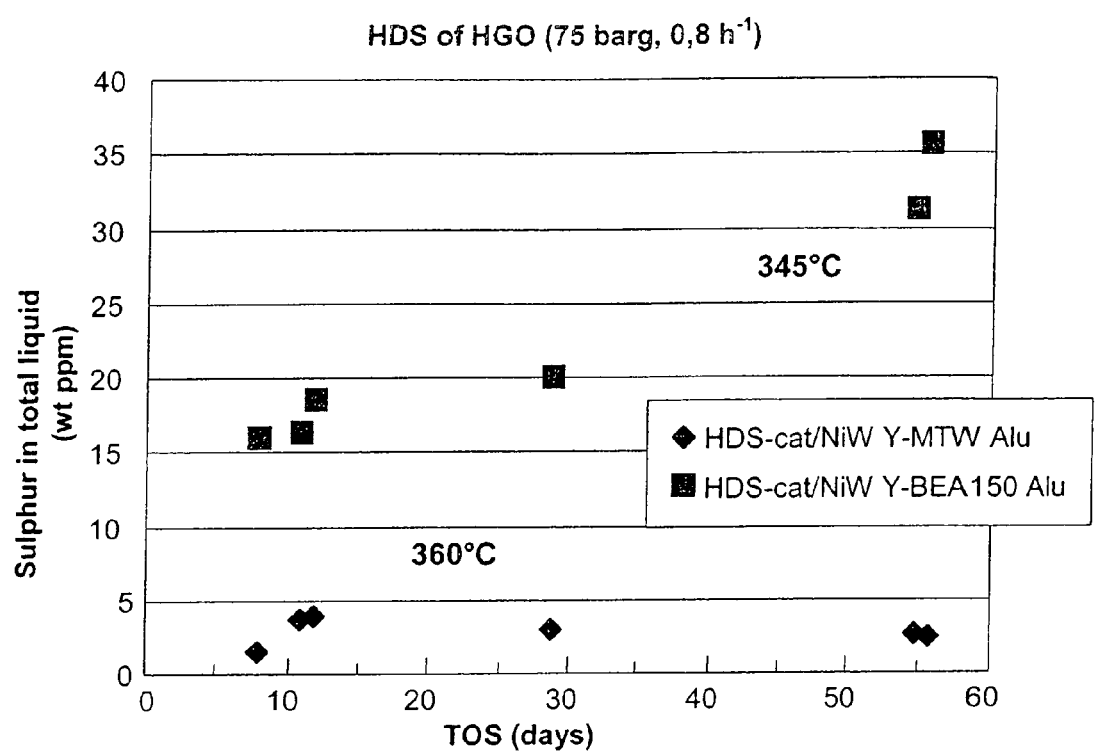
FIG. 7 is a diagram which shows the sulphur content and the liquid total product as a function of the test time (TOS).

FIG. 7 shows a diagram where the sulphur content in the liquid total product is shown as a function of the test period time on stream (TOS).

The HDS stability of the catalysts according to the invention Ni—W/Y-MTW, alu is very good. A de-activation was not observed during the entire test period. The catalyst of the prior art Ni—W/Y-BEA150, alu, however, showed a continuous deactivation.

EXAMPLE 4

Mild Hydrocracking and Ring Opening

Heavy gas oil from a light North Sea Crude was cracked and ring opened at a temperature 350° C., pressure 75 barg, hydrogen to oil ratio of 800 Nl/l and under varying LHSV in the presence of the Catalyst of Example 3 (i.e. a Ni—W/Y-MTW with a commercially available Ni—W hydrotreating catalyst.

The feed had the following characteristics:

|  | Method | Unit | HGO |
| --- | --- | --- | --- |
| Density | D-4052 | kg/l | 0.8867 |
| Nitrogen | D-4629 | ppm | 250 |
| Sulfur | D-5453 | ppm | 2884 |
| Aromatics - mono | IP391 | wt % | 17.7 |
| Aromatics - di | IP391 | wt % | 8.6 |
| Aromatics - tri | IP391 | wt % | 3.8 |
| Atomatics - total | IP391 | wt % | 30.1 |
| CI | D-4737/90 |  | 55.6 |
| IBP | D-86 | ° C. | 286 |
| 5% Recovered | D86 | ° C. | 311 |
| 10% Recovered | D86 | ° C. | 322 |
| 20% Recovered | D86 | ° C. | 335 |
| 30% Recovered | D86 | ° C. | 343 |
| 40% Recovered | D86 | ° C. | 351 |
| 50% Recovered | D86 | ° C. | 358 |
| 60% Recovered | D86 | ° C. | 364 |
| 70% Recovered | D86 | ° C. | 371 |
| 80% Recovered | D86 | ° C. | 379 |
| 90% Recovered | D86 | ° C. | 391 |

-continued

| | Method | Unit | HGO |
|---|---|---|---|
| 95% Recovered | D86 | °C. | 403 |
| FBP | D86 | °C. | 405 |

Figure 8:
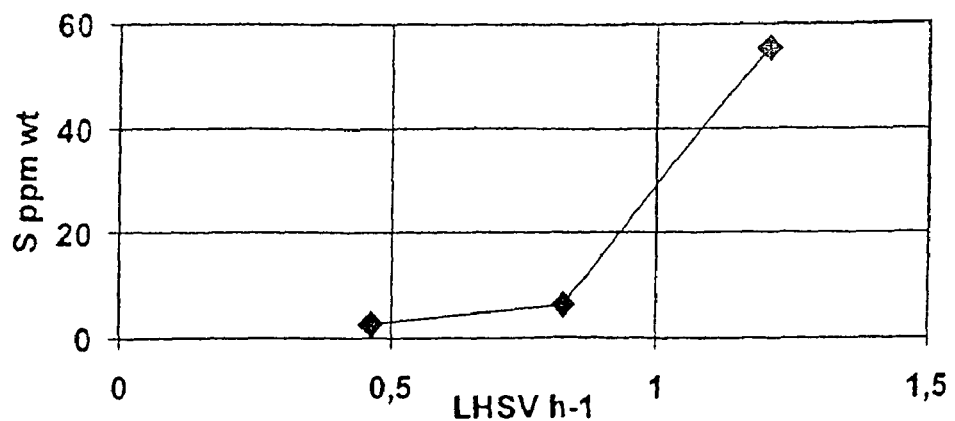
FIG. 8 is a diagram which shows the sulphur content of the hydrocracked and ring opened gas oil as a function of LHSV for a catalyst of the invention.

FIG. 8 shows a diagram which shows the sulphur content of the cracked product as a function of LHSV. At LHSV's of less than 1.0/h, sulphur content is less than 10 ppm.

EXAMPLE 5

Mild Hydrocracking and Ring Opening

The heavy gas oil feed of Example 4 was cracked and ring opened at a pressure of 75 barg, a hydrogen to oil ratio of 800 Nl/l and a LHSV of 0.8/h in the presence of the catalyst of example 3.

Figure 9:
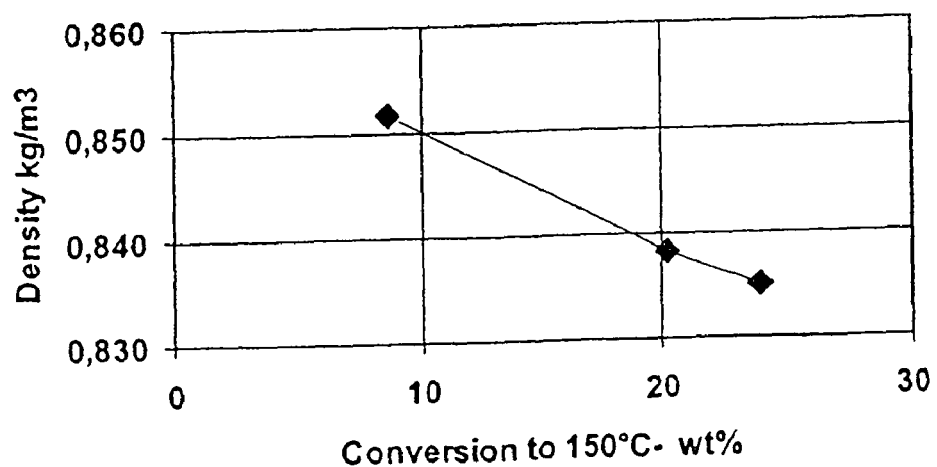
FIG. 9 is a diagram which shows the density of the total liquid product from hydrocracking as a function of the conversion of gas and naphtha for a catalyst of the invention.

In FIG. 9, the density of the cracked gas oil product is depicted as a function of the conversion, i.e. the yield of (naphtha+gas) at the various temperatures employed. It is clearly shown that it is possible to satisfy the automotive diesel specification of less than 0.845 kg/m$^3$. The aim of the conversion is a significant lowering of the gas oil density in order to make the starting material employed (feed) accessible to use as a diesel fuel without too large a quantity of light products (naphtha and C1-C4 gases) being formed during the conversion. This aim is achieved with the catalysts according to the invention. By the combined hydrogenation of aromatics and subsequent ring-opening reaction in the case of the catalysts according to the invention, a significant lowering of the gas oil density is achieved, without the content of light naphtha increasing too greatly.

Figure 10:
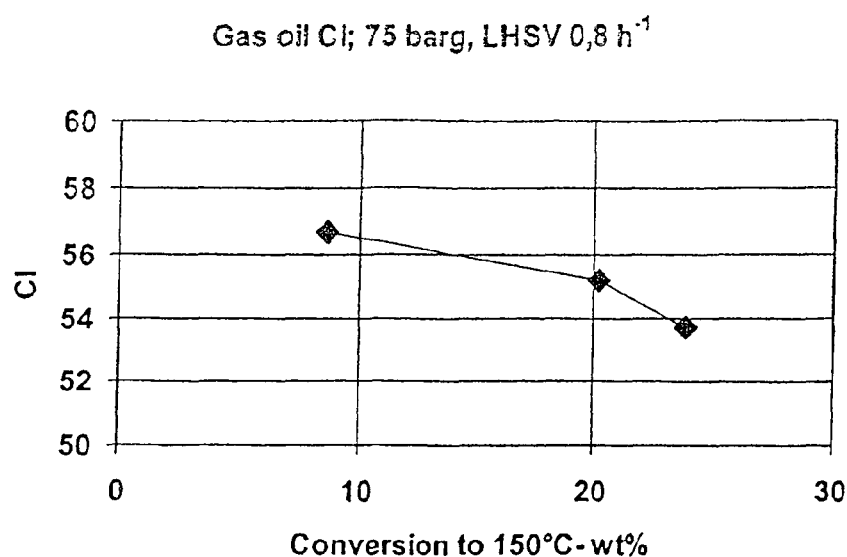
FIG. 10 is a diagram which shows the cetane index (CI) of the hydrocracked and ring opened gas oil as a function of conversion (gas+naphtha) for a catalyst of the invention.

In FIG. 10, the cetane index of the cracked product is depicted as a function of the yield of naphtha and gases. The obtained cetane index is far above the minimum 51 requirement.

EXAMPLE 6

Mild Hydrocracking and Ring Opening

Figure 11:
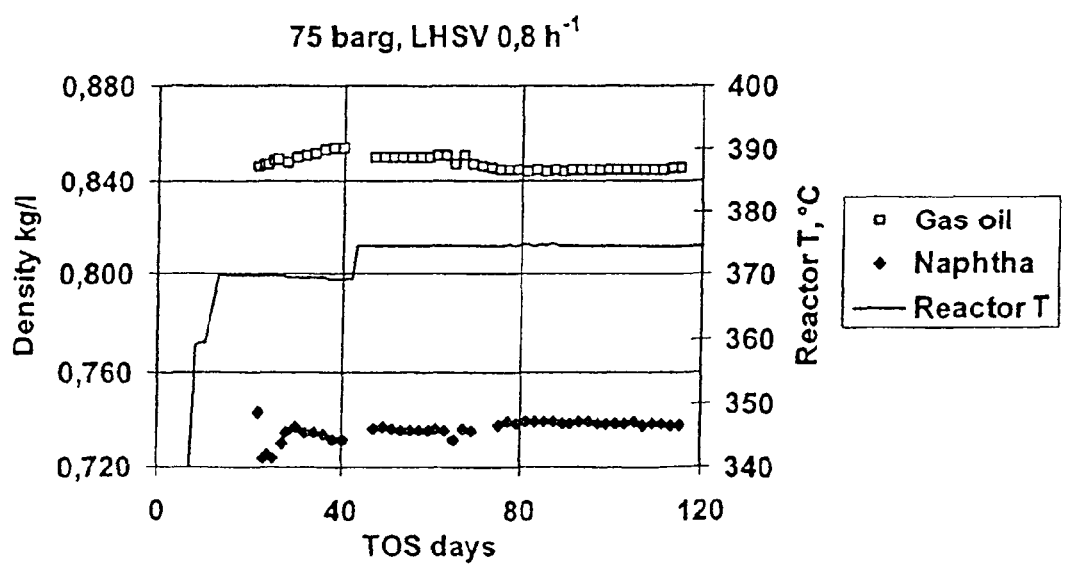
FIG. 11 is a diagram which shows the catalyst stability, i.e. the naphtha and gas oil densities as a function of test time (TOS) for a catalyst of the invention.

The heavy gas oil feedstock of Example 4 was cracked and ring opened at a pressure of 75 barg, a hydrogen to oil ratio of 800 Nl/l and a LHSV of 0.8/h in the presence of the catalyst of example 3. The temperature in the reactor was varied as shown in FIG. 11. The cracking and ring opening process was conducted for approximately 115 days in order to confirm catalyst stability.

FIG. 11 shows a diagram in which the density of the gas oil and naphtha fractions are shown as a function of the test duration (TOS) in order to demonstrate the stability of the catalyst of the invention. The thin line represents the reactor temperature over the course of the experiment. Deactivation of the catalyst of example 3 is not observed since the obtained densities are constant.

Figure 12:
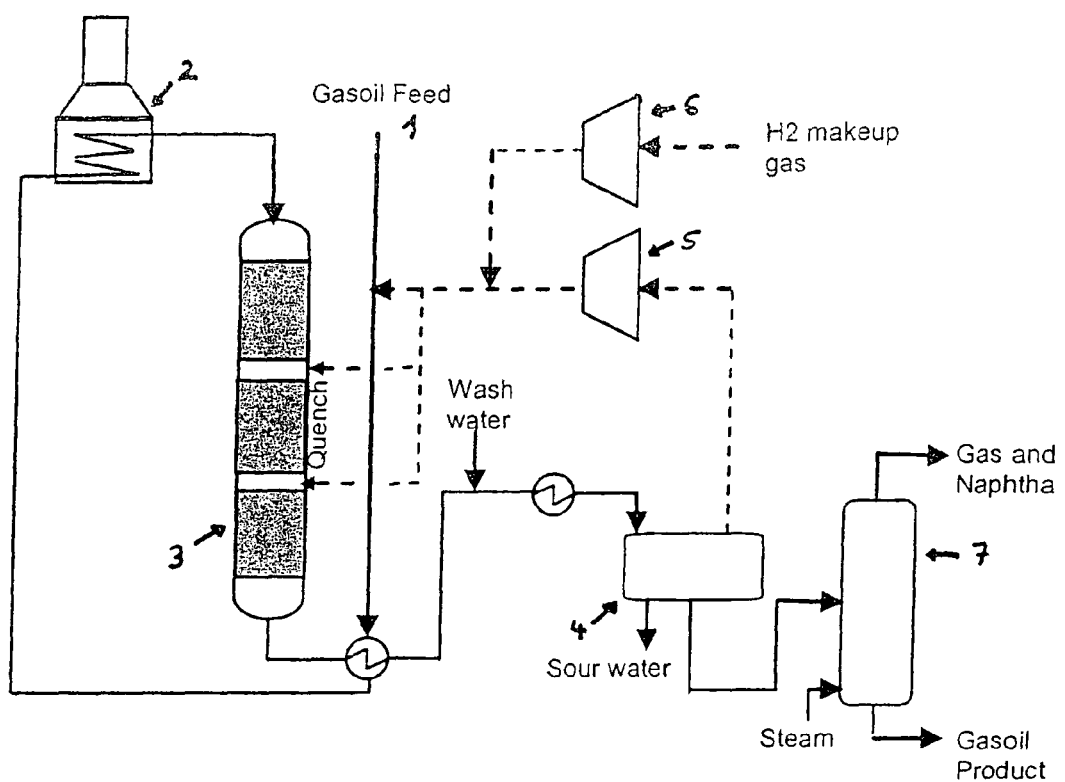
FIG. 12 is a diagram showing a potential process set up for the mild hydrocracking and ring opening process of the invention.

FIG. 12 shows a suitable reactor set up. Gasoil feed (1) is mixed with hydrogen rich treat gas and preheated to reactor inlet temperature by heat exchange with the reactor effluent stream and by a fired heater (2). The reactor feed reacts over the catalyst in the reactor (3) and the temperature increases through the reactor. The produced exotherm can be quenched by introduction of quench gas between the catalyst beds if desired. The reactor effluent is cooled and mixed with wash water before further cooling by air cooler or other heat exchange, to the required separator temperature. In the separator (4), sour water, liquid and gas are separated. Sour water is routed to the sour water system, the gas is recycled to the reactor via the recycle gas compressor (5) and after mixing with fresh H$_2$ makeup from makeup compressor (6), and the liquid is sent to the product stripper (7). In the stripper the light products, that is, gas and naphtha, are sent overhead of the column and the gasoil product is taken out as the bottom product. The gas is sent to H$_2$S recovery, the naphtha to further processing or to product tankage, and the gasoil product is sent to product tankage.

The invention claimed is:

1. A catalyst composition comprising:
   (II) a zeolite which has a faujasite structure selected from the group consisting of USY, VUSY, Y, REUSY and REY; and
   (III) a fibrous zeolite which substantially comprises non-crossing one-dimensional channels selected from the group consisting of ABW, BCT, BIK, CAN, CAS, ESV, EUO, JBW, LAU, MAZ, MTW, MWW, NES, OFF, PAR, RON, TON,
   (IV) an active amount of a catalytic active hydrogenation compound,
   provided that the fibrous zeolite of the structural type TON is not THETA-1, Nu-10, KZ-2, IS-1 and ZSM-22, wherein the catalyst composition further comprises a non-zeolite binder.

2. The catalyst composition according to claim 1, wherein the zeolite with the faujasite structure and/or the fibrous zeolite are at least partially in the H-form.

3. The catalyst composition according to claim 1, wherein the channels of the fibrous zeolite have at least eight-ring-channels.

4. The catalyst composition according to claim 1, wherein the binder is an aluminium compound.

5. The catalyst composition according to claim 4, wherein the catalytic active hydrogenation compound comprises one or more metal compounds selected from the group consisting of the metals of group VIB and VIII of the periodic table, their oxides, sulphates, nitrates, complex compounds and organic metal salts and mixtures thereof.

6. The catalyst composition according to claim 5, wherein the metal compound comprises a nickel and a tungsten and/or molybdenum compound.

7. The catalyst composition according to claim 6, wherein the nickel component is present in an amount of 1 to 10 weight-% and the tungsten and/or molybdenum component in an amount of 2 to 30 weight-% with respect to the total weight of the catalyst composition.

8. A process for the manufacture of a catalyst composition according to claim 1 comprising the steps of a) providing a zeolite with a faujasite structure and a fibrous zeolite, b) mixing both zeolites with a binder, c) formation of shaped bodies, characterized in the further following steps of:
   i) drying the shaped bodies at a temperature in the range from 100 to 130° C.,
   ii) calcinating at a temperature in a range from 400 to 600° C.,
   iii) cooling down the calcined shaped bodies to room temperature, and
   iv) applying a solution of a hydrogenation compound to the calcined catalyst composition.

9. The process according to claim 8, wherein the hydrogenation compound is water soluble.

10. The process according to claim 8, wherein the hydrogenation compound comprises one or more metal compounds, selected from Ni, W, Mo.

11. The process according to claim 8, wherein after the step of applying the hydrogenation compound the process further comprises the steps of:
  v) drying the catalyst composition at a temperature in the range from 100 to 130° C.,
  vi) calcinating said catalyst composition obtained in step v) at a temperature in a range from 400 to 500° C., and
  vii) cooling down to room temperature.

12. A hydrocracking process which comprises contacting a hydrocarbon feedstock with hydrogen and a hydrocracking catalyst composition according to claim 1.

13. The process according to claim 12 wherein said feedstock is also contacted with a hydrotreating catalyst.

14. The process according to claim 13 wherein said hydrotreating catalyst comprises Ni—W or Ni—Mo metal components.

15. The process according to claim 12 wherein said feedstock is light gas oil, heavy gas oil, a vacuum distillate, vacuum gas oil, coker gas oil, light cycle oil or feedstocks which are produced during coking or fluid catalytic cracking.

16. The process according to claim 15 wherein said feedstock is heavy or light gas oil.

17. The process according to claim 16 wherein said feedstock is straight run heavy gas oil.

18. The process according to claim 12 wherein the boiling point of the hydrocarbon feedstock is in the range from 150 to 550° C.

19. The process according to claim 12 wherein the density of the hydrocarbon feedstock is greater than 0.845 g/cm$^3$.

20. The process according to claim 19 wherein the density of the hydrocracked feedstock is less than 0.845 g/cm$^3$.

21. The process according to claim 12 wherein the feedstock has a sulphur content of at least 2000 ppm.

22. The process according to claim 21 wherein the hydrocracked feedstock has a sulphur content of less than 20 ppm.

23. The process according to claim 12 wherein said hydrocracking process is carried out at a temperature in the range from 350 to 400° C.

24. The process according to claim 12 wherein said hydrocracking process is carried out at a pressure of 10 to 150 bars.

25. The process according to claim 12 wherein said hydrocracking process is carried out at a LHSV of less than 1/h.

26. The process according to claim 12 wherein 95% of the hydrocracked feedstock has a boiling point of less than 395° C.

27. The process according to claim 12 wherein the hydrocracked feedstock has a cetane number of at least 51.

\* \* \* \* \*